(12) United States Patent
Lee et al.

(10) Patent No.: US 10,320,221 B2
(45) Date of Patent: Jun. 11, 2019

(54) WIRELESS POWER CHARGING SYSTEM

(71) Applicant: SAMSUNG ELECTRO-MECHANICS CO., LTD., Suwon-si, Gyeonggi-do (KR)

(72) Inventors: Seung Min Lee, Suwon-si (KR); Jung Young Cho, Suwon-si (KR); Doo Ho Park, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 454 days.

(21) Appl. No.: 15/138,961

(22) Filed: Apr. 26, 2016

(65) Prior Publication Data

US 2016/0344223 A1 Nov. 24, 2016

(30) Foreign Application Priority Data

May 22, 2015 (KR) .................. 10-2015-0072153
Sep. 10, 2015 (KR) .................. 10-2015-0128460

(51) Int. Cl.
*H02J 7/00* (2006.01)
*H02J 7/02* (2016.01)
(Continued)

(52) U.S. Cl.
CPC .......... *H02J 7/025* (2013.01); *H01F 27/2871* (2013.01); *H01F 38/14* (2013.01);
(Continued)

(58) Field of Classification Search
None
See application file for complete search history.

(56) References Cited

U.S. PATENT DOCUMENTS 9,225,392 B2 * 12/2015 Lehr .................. G06F 1/266
2012/0049991 A1 * 3/2012 Baarman ............ H01F 17/0013
336/199
(Continued)

FOREIGN PATENT DOCUMENTS

JP 2012-205379 A 10/2012
JP 2012205379 A * 10/2012
(Continued)

OTHER PUBLICATIONS

Notice of Office Action issued in corresponding Korean Patent Application No. 10-2015-0128460, dated Sep. 20, 2017 (With full English translation).

*Primary Examiner* — David V Henze-Gongola
(74) *Attorney, Agent, or Firm* — Morgan Lewis & Bockius LLP

(57) ABSTRACT

A wireless power charging system includes a reception coil unit including an insulating layer, a first coil including a first body portion disposed as a spiral on one surface of the insulating layer and a first lead portion extending from one end of the first body portion and led out of the insulating layer, and a second coil including a second body portion formed on the other surface of the insulating layer and electrically connected to the other end of the first body portion through a via and a second lead portion extending from the second body portion and led out of the insulating layer. The second coil has a width larger than that of the first coil and has a thickness smaller than that of the first coil.

8 Claims, 4 Drawing Sheets

(51) Int. Cl.
*H01F 27/28* (2006.01)
*H01F 38/14* (2006.01)
*H02J 50/10* (2016.01)

(52) U.S. Cl.
CPC ............ *H02J 7/0044* (2013.01); *H02J 50/10* (2016.02); *H01F 27/2804* (2013.01)

(56) References Cited

U.S. PATENT DOCUMENTS

| | | | |
|---|---|---|---|
| 2014/0197694 A1* | 7/2014 | Asanuma | H01F 38/14 307/104 |
| 2015/0028685 A1 | 1/2015 | Choi et al. | |
| 2016/0181855 A1* | 6/2016 | Muurinen | H02J 17/00 320/108 |

FOREIGN PATENT DOCUMENTS

| | | |
|---|---|---|
| KR | 10-2006-0106632 A | 10/2006 |
| KR | 10-2013-0130366 A | 12/2013 |
| KR | 10-2014-0099420 A | 8/2014 |
| KR | 10-1477408 B1 | 12/2014 |
| KR | 10-2015-0019873 A | 2/2015 |

* cited by examiner

B-B'

D-D' ized is flat.# WIRELESS POWER CHARGING SYSTEM

CROSS-REFERENCE TO RELATED APPLICATION

This application claims the benefit of priority to Korean Patent Application No. 10-2015-0072153, filed on May 22, 2015 and Korean Patent Application No. 10-2015-0128460, filed on Sep. 10, 2015 with the Korean Intellectual Property Office, the entirety of which is incorporated herein by reference.

TECHNICAL FIELD

The present disclosure relates to a wireless power charging system.

BACKGROUND

As various electronic devices have been reduced in weight in accordance with a reduction in size, a non-contact type, that is, a wireless power charging scheme for charging a battery using magnetic coupling (or inductive coupling) without electrical contact has risen in prominence.

A wireless power charging scheme is a scheme in which charging is performed through the use of electromagnetic induction. A primary coil (transmission coil) is provided in a charger (wireless power transmitting device), a secondary coil (reception coil) is provided in a charge target (wireless power receiving device), and electric power generated according to inductive coupling between the primary coil and the secondary coil is converted into energy to charge a battery.

In a wireless power charging system, charging efficiency of a wireless power charging system is significantly enhanced as core centers of a wireless power transmitting device and a wireless power receiving device are accurately aligned. Thus, in order to obtain ideal charging efficiency, the core centers of the wireless power transmitting device and the wireless power receiving device should be simply and accurately aligned.

In the related art of a wireless power charging system, however, the part of the wireless power transmitting device on which the wireless power receiving device is placed is flat. In addition, core centers of a primary coil and a secondary coil of the wireless power transmitting device and the wireless power receiving device are visually determined and approximately aligned, resulting in low accuracy regarding the core center alignment.

A reception coil of the wireless power receiving device is formed of copper having low resistance to use inductive coupling, and here, a thickness of the reception coil is manufactured to have a numerical value designed according to overall impedance and resistance values.

Also, the wireless power receiving device is manufactured using a flexible printed circuit board process. Thus, a lead portion is required in the reception coil in order to transmit an induced current through inductive coupling.

A related art reception coil has a structure in which lead portions are disposed on upper and lower surfaces of an insulating layer and a via penetrating through the insulating layer electrically connects the lead portions disposed up and down.

In the related art reception coil, the lead portions are formed to have the same thickness as that of the insulating layer of the coil unit to prevent a degradation of electrical characteristics, causing an overall size (thickness) of the reception coil unit to be increased.

SUMMARY

An aspect of the present disclosure provides a wireless power charging system in which a reception coil unit is formed to be thin without degrading electrical characteristics.

An aspect of the present disclosure also provides a wireless power charging system allowing core centers of a wireless power transmitting device and a wireless power receiving device to be simply and accurately aligned to enhance charging efficiency.

According to an aspect of the present disclosure, a wireless power charging system is provided in which a second coil of a reception coil unit of a wireless power receiving device is formed to be larger in width and thinner in thickness than a first coil.

According to another aspect of the present disclosure, a wireless power charging system may be provided in which a second lead portion of a reception coil unit is led out of an insulating layer through an upper portion of a body portion without a via.

According to another aspect of the present disclosure, a wireless power charging system may be provided in which a mounting surface in a wireless power transmitting device on which a wireless power receiving device is to be mounted includes a first mounting surface formed to be concave in relation to a center in a width direction and a second mounting surface formed to be upwardly sloped to both side portions of the first mounting surface.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION

Figure 1:
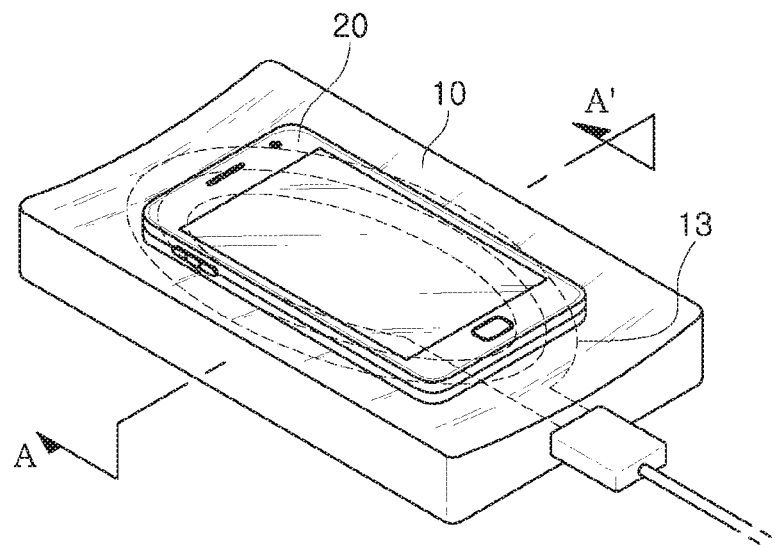
FIG. 1 is a perspective view illustrating a wireless power transmitting device and a wireless power receiving device of a wireless power charging system according to an exemplary embodiment in the present disclosure.

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the example embodiments.

Spatially relative terms, such as "above," "upper," "below," and "lower" and the like, may be used herein for ease of description to describe one element's relationship relative to one or more other element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the devices in the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, members, elements, and/or groups, but do not preclude the presence or addition of one or more other features, integers, steps, operations, members, elements, and/or groups.

Hereinafter, embodiments of the present inventive concept will be described with reference to schematic views illustrating embodiments of the present inventive concept. In the drawings, for example, ideal shapes of components are shown. However, due to manufacturing techniques and/or tolerances, components may be manufactured having modified shapes relative to those shown. Thus, embodiments of the present inventive concept should not be construed as being limited to the particular shapes of regions shown herein, but should more generally be interpreted as including changes in shape resulting from manufacturing processes and non-idealities. The inventive concepts may also be constituted by one or a combination of various embodiments shown and/or described herein.

The contents of the present inventive concept described below may have a variety of configurations. Only illustrative configurations are shown and described herein, and the inventive concepts are not limited thereto and should be interpreted as extending to all appropriate configurations.

Figure 2:
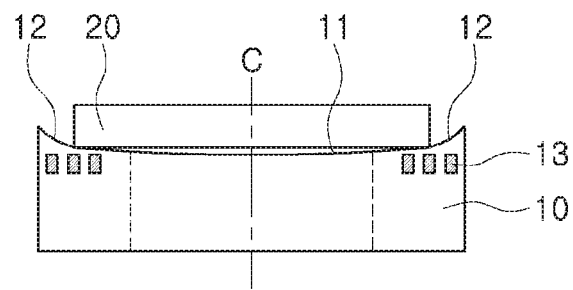
FIG. 2 is a cross-sectional view taken along line A-A' of FIG. 1.
Figure 3:
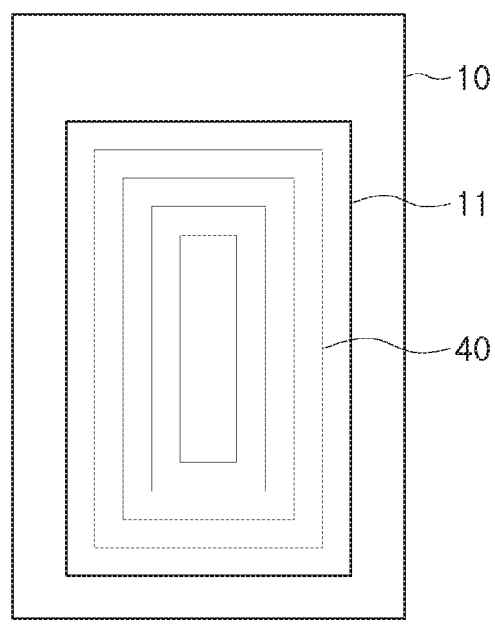
FIG. 3 is a plan view illustrating the wireless power transmitting device of FIG. 1.
Figure 4:
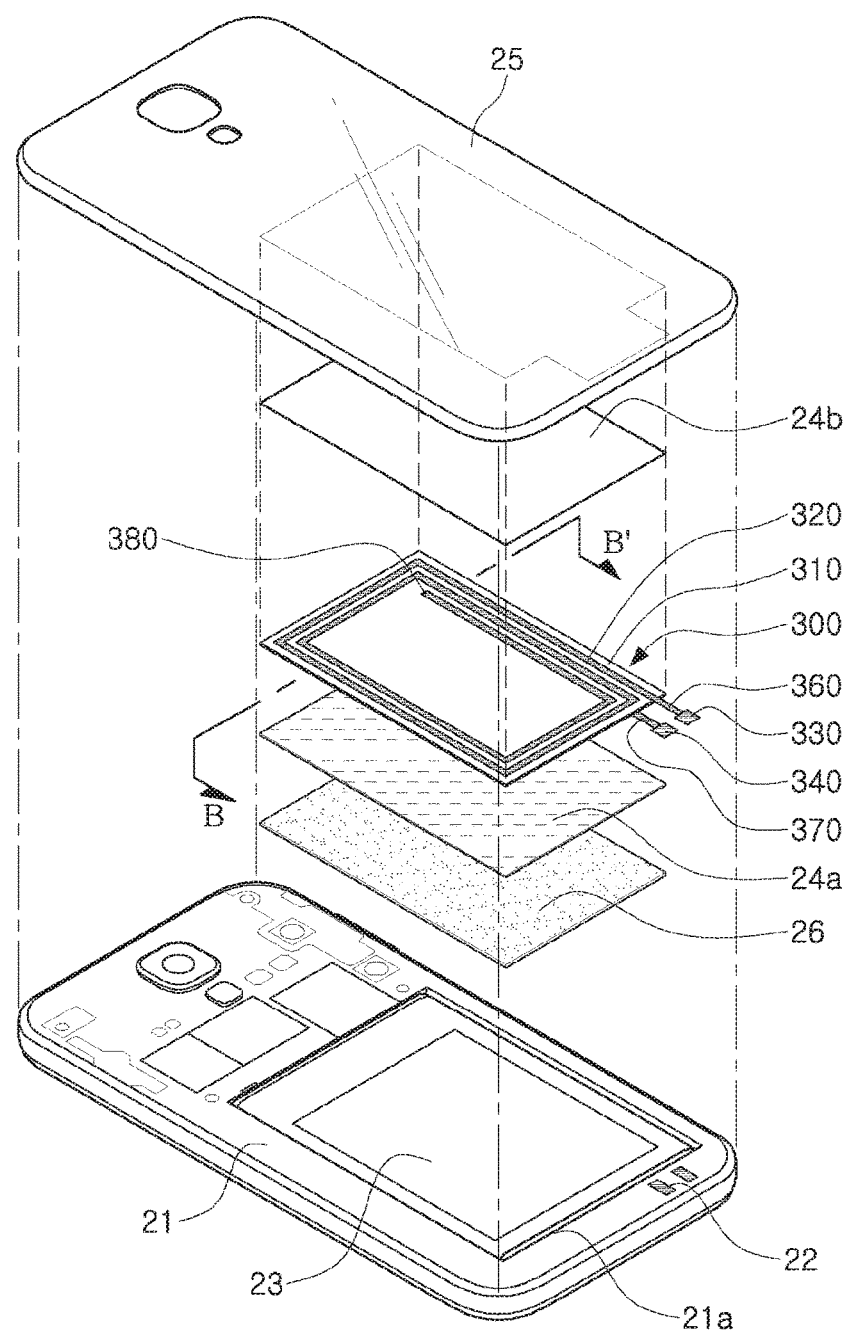
FIG. 4 is an exploded perspective view illustrating an example of the wireless power receiving device of FIG. 1.

FIG. 1 is a perspective view illustrating a wireless power transmitting device and a wireless power receiving device of a wireless power charging system according to an exemplary embodiment, FIG. 2 is a cross-sectional view taken along line A-A' of FIG. 1, FIG. 3 is a plan view illustrating the wireless power transmitting device of FIG. 1, and FIG. 4 is an exploded perspective view illustrating an example of the wireless power receiving device of FIG. 1.

Referring to FIGS. 1 through 4, a wireless power charging system according to the present exemplary embodiment may include a wireless power transmitting device 10 and a wireless power receiving device 20. The wireless power receiving device 20 is placed on one surface of the wireless power transmitting device 10.

The wireless power receiving device 20 according to the present exemplary embodiment is a device to be charged, and here, a smartphone is illustrated as an example. The wireless power receiving device is not limited to the smartphone, however, and electronic devices such as a laptop computer or a tablet PC may also be used as the wireless power receiving device.

The wireless power transmitting device 10 includes a transmission coil 13 formed on a substrate (not shown) therein, and when an alternating current (AC) voltage is applied to the wireless power transmitting device 10, a magnetic field is formed around the transmission coil 13.

Accordingly, electromotive force induced from the transmission coil 13 is generated in a reception coil unit 300 of the wireless power receiving device 20 to charge a battery 23 of the wireless power receiving device 20.

The transmission coil 13 and a coil of the reception coil unit 300 may be formed of a conductive metal having low resistance such as copper (Cu), but are not limited thereto.

In the wireless power transmitting device 10 of the present exemplary embodiment, a mounting surface on which the wireless power receiving device 20 is to be placed may include a first mounting surface 11 and a second mounting surface 12 disposed on outer side portions of the first mounting surface 11.

The first mounting surface 11 is formed to be concave in relation to the center C in a width direction, and the second mounting surface 12 may be formed to be upwardly sloped to overlap at least a portion of both sides of the wireless power receiving device 20 in the thickness direction.

In a general wireless power charging system, an induced current is proportional to the square of the number of windings and an area of the overall coil unit.

In the present exemplary embodiment, the transmission coil 13 is disposed to be concentrated in the second mounting surface 12.

In this manner, when the mounting surface of the wireless power transmitting device 10 has such a curvature, loss of magnetic characteristics may be reduced and the number of windings may be increased to form an induced current with high efficiency. The overall area of the transmission coil 13 may be increased as much as possible, and heat generated by the coil during charging may be more smoothly dissipated.

Also, when the transmission coil 13 is disposed to be concentrated in the second mounting surface 12, alignment of core centers of the transmission coil 13 of the wireless power transmitting device 20 and the reception coil unit 300 may be enhanced to further increase charging efficiency of the wireless power charging system.

The wireless power transmitting device 10 may have a structure in which both upper and lower surfaces thereof have the first and second mounting surfaces 11 and 12. In this case, since upper and lower surfaces of the wireless power transmitting device 10 may be used as mounting surfaces of the wireless power receiving device, vertical directionality of the wireless power transmitting device 10 may be removed.

In another example, the wireless power transmitting device 10 may be formed to be thick in such a manner that both side surfaces thereof have an area similar to that of the upper and lower surfaces.

Here, both side surfaces of the wireless power transmitting device 10 may have a structure having first and second mounting surfaces.

In this case, since both side surfaces of the wireless power transmitting device may be used as mounting surfaces of the wireless power receiving device, both vertical directionality and horizontal directionality of the wireless power transmitting device may be removed.

Referring to FIG. 3, an alignment mark 40 having a shape of a plurality of bands gradually increasing in size, and centered on the center C in a width direction may be formed on the mounting surface (in particular, the first mounting surface) of the wireless power transmitting device 10.

In the present exemplary embodiment, the alignment mark 40 is illustrated and described as having a quadrangular band shape, but the alignment mark 40 may be variously modified to a plurality of concentric circles, for example.

Also, the alignment mark 40 may be formed in a fluorescent color, for example. This may enhance distinctiveness to assist the user in aligning the core centers more accurately.

Here, auxiliary alignment marks in such forms as "⌈", "⌉", "L", and "⌋" may be further formed in portions corresponding to the corners of the wireless power receiving device 20 in the second mounting surface 12.

Figure 5:
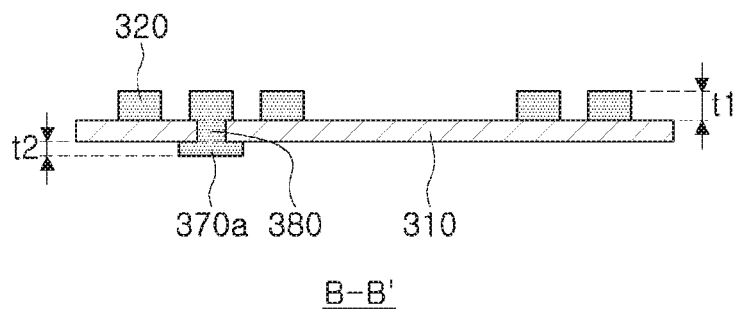
FIG. 5 is a cross-sectional view of a reception coil unit of FIG. 4, taken along line B-B'.

FIG. 4 is an exploded perspective view illustrating an example of the wireless power receiving device of FIG. 1, and FIG. 5 is a cross-sectional view of a reception coil unit 300 of FIG. 4, taken along line B-B'.

Referring to FIGS. 4 and 5, the wireless power receiving device 20 according to the present exemplary embodiment includes a body part 21, a battery 23, a reception coil unit 300, and a battery cover 25. The body part 21 includes a battery receiving recess 21a and a coil connection portion 22.

Here, an external surface of the battery cover 25 may have a convex curved surface centered around the center to correspond to the mounting surface of the wireless power transmitting device 10. In this manner, when the external surface of the battery cover 25 is configured to have such a curvature, loss of magnetic characteristics may be reduced, and the number of windings may be increased, while increasing the maximum overall area of the reception coil, thus enhancing the charging efficiency.

The battery 23 may be a nickel hydrogen battery or a lithium ion battery that can be charged or discharged, but the type of the battery 23 is not limited thereto.

The battery 23 may be configured to be separable from the wireless power receiving device 20 and detachably installed in the battery receiving recess 21a of the body part 21 of the wireless power receiving device 20, or it may be integrally configured with the wireless power receiving device 20 to realize an integral structure.

The battery cover 25 may be coupled to a rear surface of the body part 21 in such a manner that the battery 23 may not be separated from the body part 21. Here, a first adhesive layer 24b may be disposed on one surface of the reception coil unit 300 and attached to an internal surface of the battery cover 25.

A second adhesive layer 24a may be disposed on the other surface of the reception coil unit 300, and a magnetic sheet 26 may be attached to the second adhesive layer 24a.

The magnetic sheet 26 concentrates magnetic flux to allow the reception coil unit 300 to effectively receive concentrated magnetic flux and also prevents magnetic flux from reaching the battery 23.

The reception coil unit 300 according to the present exemplary embodiment includes an insulating layer 310 and first and second coils respectively disposed on both surfaces of the insulating layer 310.

The first coil includes a first body portion 320 forming a spiral on a first surface of the insulating layer 310 and a first lead portion 360 extending from the first body portion 320 so as to be led out from the insulating layer 310.

The second coil includes a second body portion 370a formed on a second surface of the insulating layer 310 opposing the first surface and is electrically connected to an end of the first coil through a via 380. A second lead portion 370 extends from the second body portion 370a and is led out of the insulating layer 310.

Here, a slit may be formed on the second surface of the insulating layer 310, and the second body portion 370a may be formed to be inserted into the slit.

The first and second lead portions 360 and 370 may be led out through the same surface of the insulating layer 310 and connected to the coil connection portion 22 of the wireless power receiving device 20 to transmit a current.

Also, the second body portion 370a and the second lead portion 370 of the second coil may be processed or compressed to have a flat shape in order to have a relatively increased width and reduced thickness compared with the first body portion 320 and the first lead portion 360 of the first coil.

That is, since the second coil is formed to have a relatively large width compared to its thickness, an overall area of the second coil is substantially similar compared to a case in which a thickness of the second coil is the same as that of the first coil.

Thus, the second coil may exhibit electrical characteristics similar to those exhibited before being reduced in thickness. Also, an overall thickness of the reception coil unit 300 may be reduced compared to a case in which the first and second coils have the same thickness. Thus, a design appropriately coping with a limited installation space of small electronic devices such as smartphones, while maintaining a predetermined level of wireless power charging efficiency, may be provided.

For example, a thickness t1 of the first coil (the first body portion 320 and the first lead portion 360) may be 100 μm or greater, and a thickness t2 of the second coil (the second body portion 370a and the second lead portion 370) may be 50 μm or less. Here, a portion corresponding to the reduced thickness in the second coil may be filled with an insulating material.

First and second electrode pads 330 and 340 may be respectively provided to be connected to ends of the first and second lead portions 360 and 370, respectively. The first and second electrode pads 330 and 340 may extend an area in which the first and second electrode pads 330 and 340 are in contact with the wireless power receiving device to enhance electrical connectivity.

Figure 6:
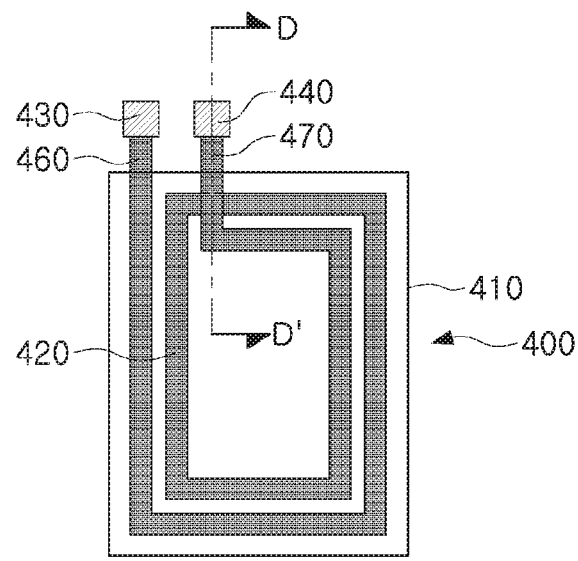
FIG. 6 is a plan view illustrating another example of a reception coil unit of the wireless power receiving device of FIG. 1, excluding a coating layer.
Figure 7:
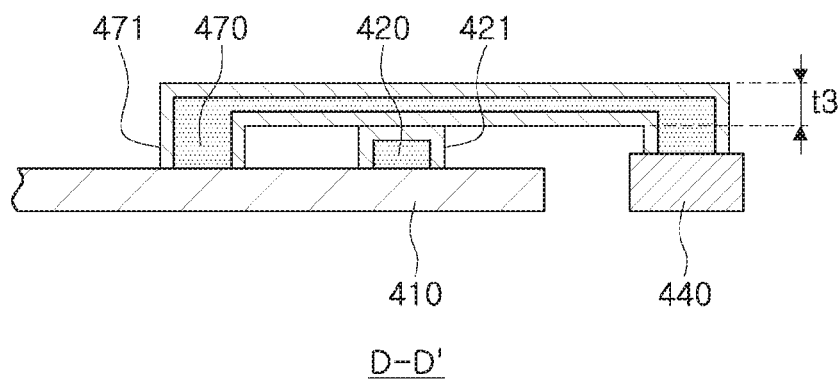
FIG. 7 is a cross-sectional view of FIG. 6, taken along line D-D'.

FIG. 6 is a plan view illustrating another example of a reception coil unit of the wireless power receiving device of FIG. 1, excluding a coating layer, and FIG. 7 is a cross-sectional view of FIG. 6, taken along line D-D'.

Here, a detailed description of the same parts as those of the exemplary embodiment described above will be omitted in order to avoid redundancy.

Referring to FIGS. 6 and 7, a reception coil unit 600 according to the exemplary embodiment may include an insulating layer 410 and a coil unit.

The coil unit may include a body portion 420 in the form of a spiral on one surface of the insulating layer 410, a first lead portion 460 extending from one end of the body portion 420 so as to be led out of the insulating layer 410, a second lead portion 470 extending from the other end of the body portion 420 by traversing the spirally formed body portion 420 vertically or slantingly and led out of the insulating layer 410, and a coating layer formed on an interface between the body portion 420 and the second lead portion 470 to insulate the body portion 420 and the second lead portion 470 from each other.

In another example, the second lead portion 470 may be configured to extend from the other end of the body portion 420 and be led out of an insulating layer through a gap between spirally formed body portions.

The reception coil unit 400 does not use a via, and the second lead portion 470 may be bent from the other end of the body portion 420 and led out in the same direction as that of the first lead portion 460.

Here, the first and second lead portions 460 and 470 may be connected to the coil connection portion 22 of the wireless power receiving device 20 to transmit a current.

Also, the coating layer may be divided into a body portion coating layer 421, a first lead portion coating layer (not shown), and a second lead portion coating layer 471 respectively covering surfaces of the body portion 420, the first lead portion 460, and the second lead portion 470. Here, a thickness t3 of the second lead portion 470 including the second lead portion coating layer 471 may be 50 µm or less.

A first electrode pad 430 and a second electrode pad 440 may be connected to ends of the first lead portion 460 and the second lead portion 470, respectively. The first and second electrode pads 430 and 440 may serve to increase an area in contact with the coil connection portion 22 of the wireless power receiving device 20 to enhance electrical connectivity.

As set forth above, according to exemplary embodiments, since the second reception coil disposed on the second surface of the insulating layer is formed to be larger than the first reception coil in width and reduced in thickness, the reception coil unit may be formed to be thinner without degrading electrical properties.

While exemplary embodiments have been shown and described above, it will be apparent to those skilled in the art that modifications and variations could be made without departing from the scope of the present invention as defined by the appended claims.

What is claimed is:

1. A wireless power receiving device which receives electric power wirelessly from a wireless power transmitting device, the wireless power receiving device including a reception coil unit, wherein the reception coil unit includes:
    an insulating layer;
    a first coil including a first body portion disposed as a spiral on a first surface of the insulating layer and a first lead portion extending from a first end of the first body portion and led out of the insulating layer; and
    a second coil including a second body portion disposed on a second surface of the insulating layer opposing the first surface and electrically connected to a second end of the first body portion through a via and a second lead portion extending from the second body portion and led out of the insulating layer,
    wherein the second coil has a width larger than that of the first coil and a thickness smaller than that of the first coil.

2. The wireless power receiving device of claim 1, further comprising first and second electrode pads provided to be respectively connected to ends of the first and second lead portions.

3. The wireless power receiving device of claim 1, wherein the first and second lead portions are led out through the same surface of the insulating layer.

4. The wireless power receiving device of claim 1, wherein the thickness of the first coil is 100 µm or greater, and the thickness of the second coil is 50 µm or less.

5. The wireless power receiving device of claim 1, further comprising a slit on the second surface of the insulating, layer, wherein the second body portion is inserted into the slit.

6. The wireless power receiving device of claim 1, wherein the first body portion and the second body portion have a same cross-sectional shape.

7. The wireless power receiving device of claim 6, wherein the same cross-sectional shape is rectangular.

8. The wireless power receiving device of claim 1, wherein each of the first and second coil is conductive across the entire width and thickness thereof.

* * * * *